March 23, 1965  H. T. HALLOWELL, JR  3,174,385
TWIST-OFF NUT
Filed Dec. 4, 1962

INVENTOR.
HOWARD THOMAS HALLOWELL, JR
BY
Synnestvedt & Lechner
ATTORNEYS

3,174,385
TWIST-OFF NUT

Howard T. Hallowell, Jr., Rydal, Pa., assignor to Standard Pressed Steel Co., Jenkintown, Pa., a corporation of Pennsylvania
Filed Dec. 4, 1962, Ser. No. 242,175
2 Claims. (Cl. 85—61)

This invention relates to fasteners and more particularly to a fastener which includes a threaded nut having means to control, within relatively narrow limits, the amount of torque which can be applied to the nut so as to provide uniform clamping forces upon loading of the nut.

Generally, when it is desired to install a nut under a predetermined load, power tools are used which are equipped with some kind of torque control. However, most of these torque controlled tools inherently produce large variations in torque and thereby cause large variations in the clamping forces of the assembled nut and bolt. Further visual inspection is not always feasible where standard nuts are installed with a torque control power tool.

Accordingly, it is an object of the present invention to provide a nut having means for accurately limiting and controlling the torque which can be applied to it so that the nut and bolt can be installed under predetermined conditions of loading and develop uniform clamping forces.

It is also an object of this invention to provide a nut which, when installed, can readily be visually inspected to determine whether the nut is under a desired minimum predetermined load.

Other objects and advantages of this invention will appear in the ensuing description.

According to this invention these objects are achieved by a nut having a body portion and a twist-off or end portion adapted to be separated from the body portion at predetermined torque values, said body having an axial bore, a portion of the bore within the body being provided with internal threads, the twist-off portion being provided with driving surfaces and having an area of reduced wall thickness defining an internal circumferential groove in the bore adjacent said body portion which groove forms a shear plane at the point where the body and end portions are to be separated.

Heretofore, one method of attempting to control nut loading involved forming a circumferential groove in the outer wall of the nut between the bearing face and the nut driving surfaces. This arrangement reduced the cross sectional area of the nut body in the vicinity of the groove and thereby formed a "breakneck" where the resistance to shearing is reduced. When a nut having such a groove is installed and loaded, the driving end portion away from the bearing face will be sheared and twisted off at the breakneck upon the application of a predetermined torque. However, there are certain disadvantages in nuts having the external groove which are not encountered where the "breakneck" is formed by an internal groove in accordance with the present invention. Specifically, if an internally grooved nut and an externally grooved nut have the same configuration insofar as the size, shape and mass of the driving portion are concerned so as to provide for interchangeability with present tooling, and if such nuts are designed to be installed under the same load—i.e., to shear off portions of the nut when a given predetermined torque has been exceeded, the internally grooved nut will shear off with a cleaner break and fewer objectionable burrs than will the externally grooved nut. This is due to the geometry of the breaknecks. The cross-sectional area of the material in the shear plane will determine the amount of torque which must be applied to twist off the end portion of the nut; and this is true whether the breakneck is formed by an external groove or an internal groove. In other words, if the nuts are designed to shear under a given torque, they must have substantially the same amount of material in the shear plane. However, where the nuts are otherwise of the same size and configuration, the internally grooved nut can have a thinner wall in the breakneck than the externally grooved nut and still the cross-sectional areas will be the same. Because of the thinner wall there will be much less burring and the separation will be cleaner.

The above and other features of this invention will be fully understood from the following detailed description and the accompanying drawings, in which.

Figure 1:
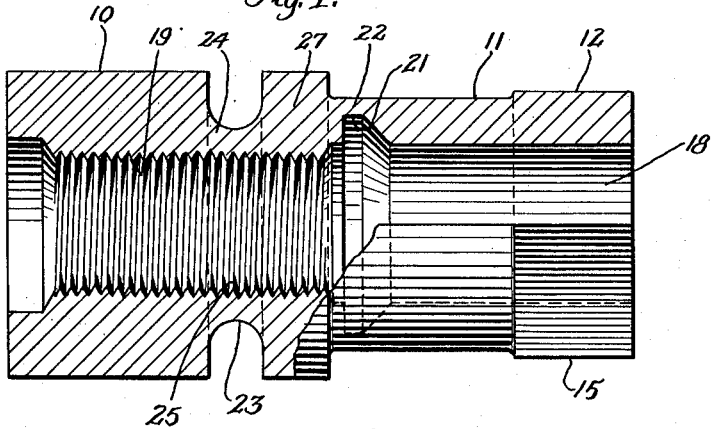
FIG. 1 is a side elevation, part in cross-section and part in ¾ section, of a nut made in accordance with the present invention.
Figure 2:
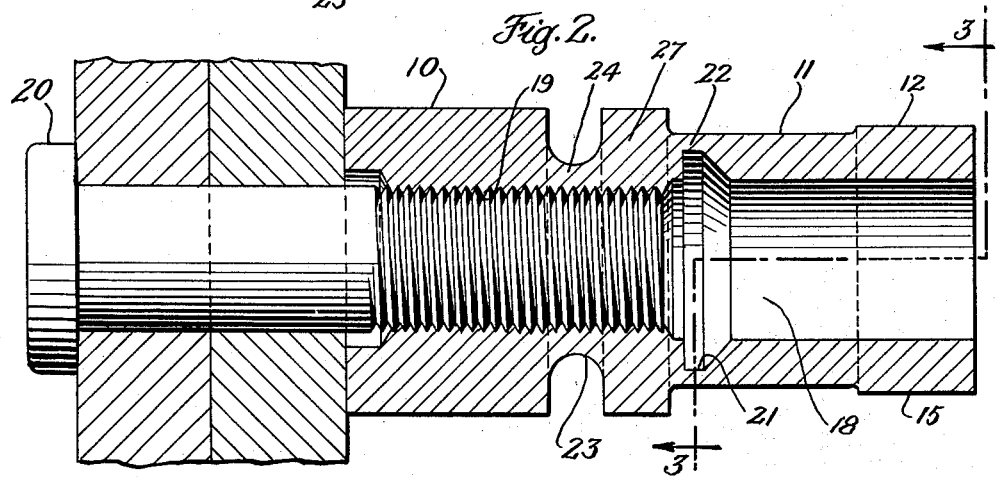
FIG. 2 is a side elevation in section showing two panels secured in place by a bolt and a nut made in accordance with the present invention.

As shown in FIGURE 1, the nut comprises a body portion 10, preferably of substantially circular cross-section. An end or twist off portion 11 is integral with the body section and is provided with suitable driving surfaces 12–17. The driving or wrench engaging surfaces as illustrated may take the form of flats, forming a conventional hex head; other configurations of the driving surfaces will be readily apparent to those skilled in the art.

The body section is provided with an axial bore 18 and portions thereof are internally threaded 19, for cooperation with an externally threaded bolt or similar fastening device 20. The bore preferably extends throughout the body 10 and end portion 11, but may terminate within the end portion 11, if desired. An internal groove 21 is positioned within the end portion adjacent the body portion. The groove 21 provides an area of reduced wall thickness at this point and forms a shear plane between the body 10 and the end portion 11. The thickness of the wall 22 surrounding the internal shear groove 21 is such that when a predetermined torque is applied to the nut, the end portion will be separated from the body. As previously mentioned, the actual wall thickness will determine the force needed to effect separation or shearing. For a given size and configuration of nut, increasing the wall thickness of the material surrounding the groove will increase the loading capability of the nut and vice versa. The employment of a substantially uniform wall thickness in the area defining the shear groove will also serve to assist in obtaining a substantially clean break.

Figure 3:
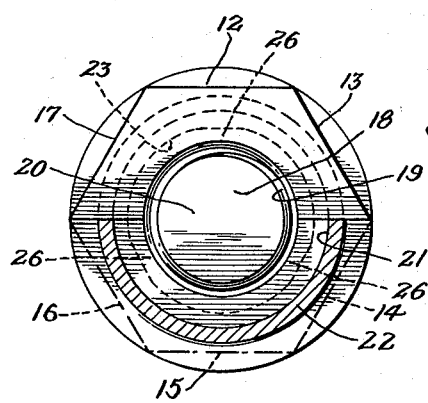
FIG. 3 is a section taken at line 3—3 in FIGURE 2.

In order to maintain the nut in its torqued condition, various forms of thread locking means can be employed. A preferred form of the lock, the distorted thread, is illustrated in the drawings. Thus, an external or circumferential locking groove 23 is provided in the outer periphery of the nut body. This groove forms a relatively thin walled section 24, and the threads 25 in the zone generally subtended by the locking groove are distorted inwardly of the bore at at least one point and generally, at two or three points, as indicated at 26 in FIG. 3, to give the subtended threads a non-circular configuration.

Preferably, the external locking groove 23 and the internal shear groove 21 are separated by sufficient material 27 to prevent distortion of the walls 22 in the vicinity of the shear groove when pressure is applied to distort the threads 25. The heavier wall 27 keeps the wall 22 in the vicinity of the groove 21 from distorting. This makes the shear area a uniform circular shape which reduces one element of possible scatter in shear strength of the section. Thus, more uniform bolt loading can be attained since the shear strength is more constant.

I claim:
1. A nut having a body portion and an end portion adapted to be separated from the body portion at predetermined torque values, said body having an axial bore, portions of the bore within the body being provided with internal threads, the twist-off end portion being unthreaded and provided with driving surfaces and having an area of reduced wall thickness defining an internal circumferential groove in the bore adjacent said body portion which groove forms a shear plane at the point where the body and end portions are to be separated, said nut further having an external circumferential groove in the portion of the body which is threaded, the threads in the zone generally subtended by the external groove being distorted inwardly of said bore to a non-circular configuration, and wherein said external groove and said internal groove are axially separated by a portion of said body which extends from said bore to a distance radially beyond the bottom of each of said grooves to thereby provide sufficient material to prevent distortion of the walls in the vicinity of the shear groove upon distorting the threads in the locking groove.

2. A nut according to claim 1, wherein the body portion between the grooves has an outside diameter greater than the outside diameter of the body in the zone subtended by the internal groove.

References Cited by the Examiner

UNITED STATES PATENTS

| | | | |
|---|---|---|---|
| 1,457,749 | 6/23 | Rast | 85—1 |
| 2,754,871 | 7/56 | Stoll. | |
| 2,880,830 | 4/59 | Rohe. | |
| 2,940,495 | 6/60 | Wing | 85—61 |

EDWARD C. ALLEN, *Primary Examiner.*